(12) United States Patent
Li

(10) Patent No.: US 11,431,125 B2
(45) Date of Patent: Aug. 30, 2022

(54) CONNECTOR, DISPLAY SCREEN AND ELECTRONIC DEVICE

(71) Applicants: HKC Corporation Limited, Guangdong (CN); Chongqing HKC Optoelectronics Technology Co., Ltd., Chongqing (CN)

(72) Inventor: Wenxin Li, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 466 days.

(21) Appl. No.: 16/491,170

(22) PCT Filed: Nov. 23, 2018

(86) PCT No.: PCT/CN2018/117080
§ 371 (c)(1),
(2) Date: Sep. 5, 2019

(87) PCT Pub. No.: WO2020/062519
PCT Pub. Date: Apr. 2, 2020

(65) Prior Publication Data
US 2021/0151933 A1    May 20, 2021

(30) Foreign Application Priority Data
Sep. 30, 2018 (CN) .......................... 201811165477.X

(51) Int. Cl.
*H01R 11/30* (2006.01)
*H01R 13/62* (2006.01)
(Continued)

(52) U.S. Cl.
CPC .......... *H01R 13/6205* (2013.01); *H01F 7/06* (2013.01); *G02F 1/1345* (2013.01); *H01F 2007/062* (2013.01); *H01R 12/716* (2013.01)

(58) Field of Classification Search
CPC ..... H01R 13/6205; H01R 12/716; H01F 7/06; H01F 2007/062; G02F 1/1345
See application file for complete search history.

(56) References Cited

U.S. PATENT DOCUMENTS 6,370,257 B1 * 4/2002 Bleim ................ H04R 9/06
381/409
7,311,526 B2 * 12/2007 Rohrbach ................ G06F 1/18
439/39
(Continued)

FOREIGN PATENT DOCUMENTS

CN      1606817 A      4/2005
CN    103163669 A      6/2013
(Continued)

*Primary Examiner* — Thanh Tam T Le

(57) ABSTRACT

Disclosed are a connector, a display screen, and an electronic device. The connector includes a first connection end, a second connection end, and an anti-off part. The second connection end is detachably connected to the first connection end; the anti-off part is configured to restrict the first connection end and the second connection end from being separated from each other and disconnected when the first connection end and the second connection end are energized and conductive.

7 Claims, 4 Drawing Sheets

(51) Int. Cl.
*H01F 7/06* (2006.01)
*G02F 1/1345* (2006.01)
*H01R 12/71* (2011.01)

(56) References Cited

U.S. PATENT DOCUMENTS

| | | | | |
|---|---|---|---|---|
| 7,331,793 | B2* | 2/2008 | Hernandez | H01F 38/14 |
| | | | | 439/38 |
| 7,351,066 | B2* | 4/2008 | DiFonzo | H01R 13/6205 |
| | | | | 439/39 |
| 7,508,622 | B2* | 3/2009 | Martin | G11B 33/124 |
| | | | | 439/79 |
| 8,496,494 | B2* | 7/2013 | Jordan | H01R 13/6277 |
| | | | | 439/680 |
| 8,529,274 | B2* | 9/2013 | Li | H01R 13/6205 |
| | | | | 439/38 |
| 9,170,376 | B2* | 10/2015 | Fortusini | G02B 6/38 |
| 9,325,107 | B2* | 4/2016 | Karls | A61B 5/24 |
| 9,437,968 | B2* | 9/2016 | Tada | H01R 13/6205 |
| 9,991,628 | B2* | 6/2018 | Daoura | H01R 13/6205 |
| 10,097,743 | B2* | 10/2018 | Rodriguez | H04N 5/2252 |
| 10,205,279 | B2* | 2/2019 | Endo | G01R 1/07371 |
| 10,390,416 | B2* | 8/2019 | Ejiri | H02J 13/0003 |
| 10,541,484 | B2* | 1/2020 | Hsu | H01R 13/2421 |
| 10,658,789 | B1* | 5/2020 | Wang | H01R 24/28 |
| 10,998,672 | B2* | 5/2021 | Weis | H05K 3/36 |
| 11,223,151 | B2* | 1/2022 | Underwood | H01R 13/2407 |

FOREIGN PATENT DOCUMENTS

| | | |
|---|---|---|
| CN | 203135174 U | 8/2013 |
| CN | 103682896 A | 3/2014 |
| CN | 106848776 A | 6/2017 |
| EP | 3364505 A1 | 8/2018 |

* cited by examiner

CONNECTOR, DISPLAY SCREEN AND ELECTRONIC DEVICE

RELATED APPLICATION

This application is the National Stage of International Application No. PCT/CN2018/117080, filed on Nov. 23, 2018, which claims priority to a Chinese patent application No. 201811165477.X titled "CONNECTOR, DISPLAY SCREEN AND ELECTRONIC DEVICE" applied on Sep. 30, 2018, the disclosure of which is incorporated herein by reference in its entirety.

FIELD OF THE DISCLOSURE

The present disclosure relates to field of electronic technology, in particular, to a connector, a display screen and an electronic device.

BACKGROUND OF THE DISCLOSURE

The connector can be quickly connected and separated, and is widely used in electronic devices such as display screens. However, in the prior art, when the device is energized, when the two ends of the connector are separated, that is, when the connector is "hot-plugged", the device connection may be disconnected. In the short circuit, short circuit will generate instantaneous high voltage or high current, which will cause damage to electrical components in electronic device, affecting the operational reliability and service life of electronic device.

SUMMARY OF THE DISCLOSURE

The main object of the present application is to propose a connector for preventing the two terminals from being separated from each other when the connector is energized to ensure the operational reliability and service life of the electronic device.

To achieve the above purpose, the connector proposed by the present application includes:

a first connection end;

a second connection end detachably connected to the first connection end; and an anti-off part configured to restrict the first connection end and the second connection end from being separated from each other and disconnected when the first connection end and the second connection end are energized and conductive.

In an embodiment, the anti-off part has an adsorption state and a failure status, wherein:

the anti-off part is in an adsorption state, and the anti-off part generates an adsorption force for the first connection end and the second connection end to approach each other when the first connection end and the second connection end are powered on;

the anti-off part is in a failure state, and the adsorption force of the anti-off part disappears when the first connection end and the second connection end are deenergized.

In an embodiment, the anti-off part includes a magnetic portion and a magnetic conductive portion that are mutually adsorbable, and one of the magnetic portion and the magnetic conductive portion is disposed on the first connection end, and the other is disposed on the second connection end.

In an embodiment, the magnetic conductive portion is made of iron or stainless steel.

In an embodiment, the anti-off part includes two magnetic portions that are mutually adsorbable, and one of the two magnetic portions is disposed on the first connection end, and the other is disposed on the second connection end.

In an embodiment, the magnetic portion includes an electromagnetic coil powered by an external power source.

In an embodiment, the magnetic portion includes an electromagnetic coil, and the electromagnetic coil located on the first connection end is powered by the first connection end, and the electromagnetic coil located on the second connection end is powered by the second connection end.

In an embodiment, one end of the electromagnetic coil located on the first connection end is connected to the conductivity electrode of the first connection end, and the other end is grounded to form a first current loop;

one end of the electromagnetic coil located on the second connection end is connected to the conductivity electrode of the first connection end, and the other end is grounded to form a second current loop whose current direction is opposite to that of the first current loop.

In an embodiment, the electromagnetic coil has a power supply voltage of 9V to 36V.

The present application also proposes a display screen, including a LCD module, a circuit board, a connecting line, and a connector. The circuit board is electrically connected to the LCD module, and the connector includes:

a first connection end;

a second connection end detachably connected to the first connection end; and an anti-off part configured to restrict the first connection end and the second connection end from being separated from each other and disconnected when the first connection end and the second connection end are energized and conductive;

one of the first connection end and the second connection end of the connector is disposed on the circuit board, and the other is disposed at one end of the connecting line.

The present application also proposes an electronic device including a connector, the connector comprising:

a first connection end;

a second connection end detachably connected to the first connection end; and an anti-off part configured to restrict the first connection end and the second connection end from being separated from each other and disconnected when the first connection end and the second connection end are energized and conductive.

The technical schemes of the present application can prevent the first connection end and the second connection end from being separated from each other in the energized and conductive state by providing the anti-off part in the connector, thereby avoiding the disconnection of the connector when energized and conductive. Therefore, damages to the electrical components caused by the instantaneous high voltage or high current generated by the disconnection are prevented, ensuring the operational reliability and the service life of the electronic device.

BRIEF DESCRIPTION OF THE DRAWINGS

In order to illustrate the technical schemes in the embodiments of the present application or in the prior art more clearly, the drawings which are required to be used in the description of the embodiments or the prior art are briefly described below. It is obvious that the drawings described below are only some embodiments of the present application. It is apparent to those of ordinary skill in the art that other drawings may be obtained based on the structures shown in accompanying drawings without inventive effort.

FIG. 1 is a structural schematic view of a connector of an embodiment of the present application when the first connection end and the second connection end are not connected.

The object realization, function characteristics and advantages of this application will be further described in reference to embodiments and accompanying drawings.

DETAILED DESCRIPTION OF THE EMBODIMENTS

The technical schemes of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure. All other embodiments obtained by persons of ordinary skill in the art based on the embodiments of the present disclosure without creative efforts shall fall within the scope of protection of the present disclosure.

It is to be understood that, all of the directional instructions in the exemplary embodiments of the present disclosure (such as top, down, left, right, front, back) can only be used for explaining relative position relations, moving condition of the elements under a special form (referring to figures), and so on, if the special form changes, the directional instructions changes accordingly.

In addition, if the embodiments of the present application relates to the descriptions of "first", "second" and the like, they are only used for the purpose of description only, and are not to be construed as indicating or implying their relative importance or implicitly indicating the number of technical features indicated. Thus, features defined with "first", "second" may include at least one such feature, either explicitly or implicitly. In addition, the meaning of "and/or" appearing throughout the text includes three parallel schemes, taking "A and/or B" as an example, including scheme A, or scheme B, or the scheme in which both A and B are simultaneously satisfied. In addition, the technical schemes between the various embodiments may be combined with each other, provided that those skilled in the art can implement it, and when the combination of the technical schemes is contradictory or impossible to implement, it should be considered that the combination of these technical schemes does not exist, nor is it within the scope of protection required by this application.

The present application proposes a connector that can be applied to both a display screen and other electronic devices that require electrical connection.

Figure 1:
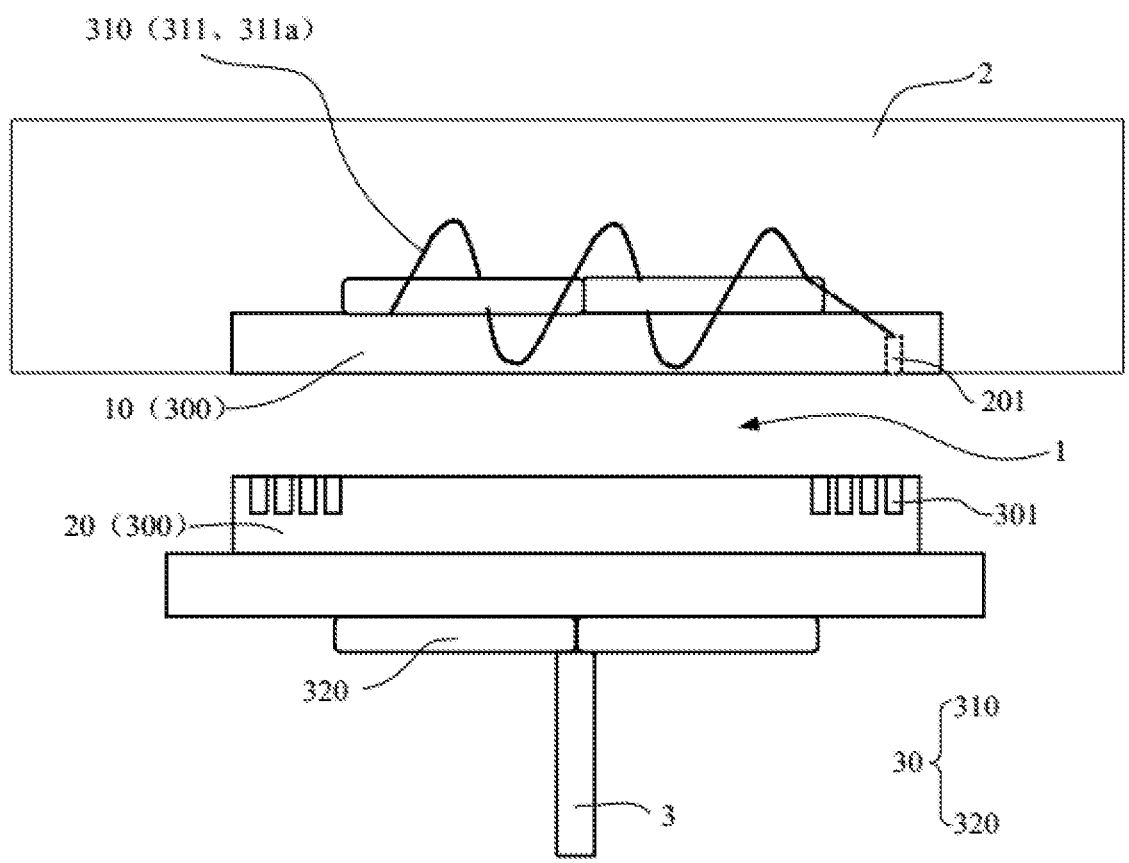
Figure 2:
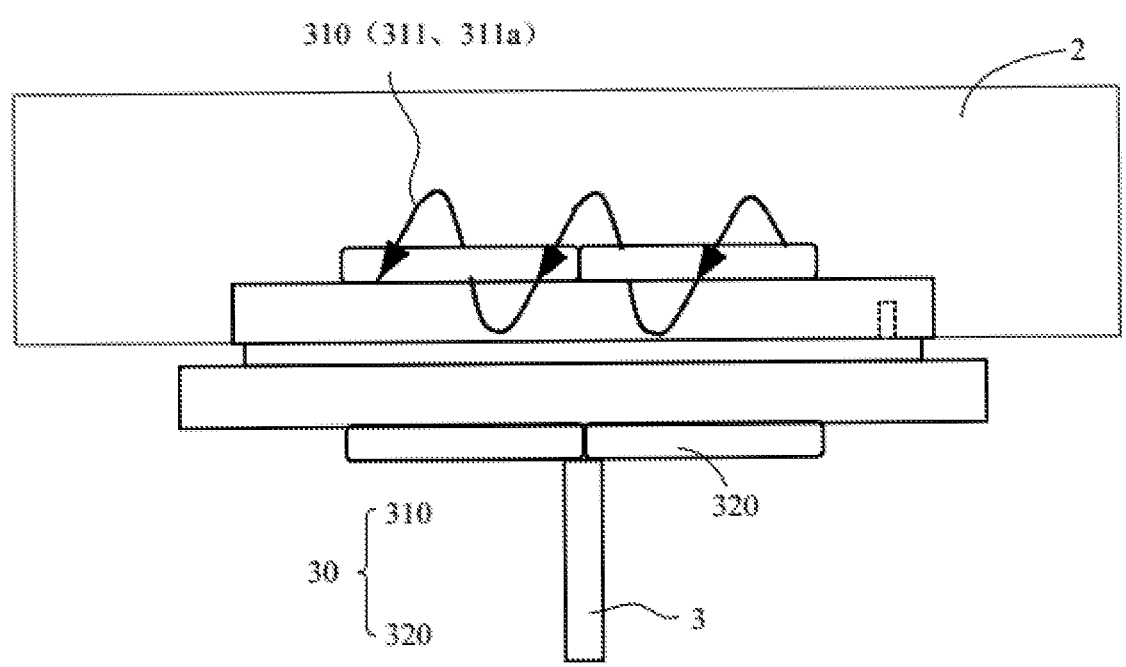
FIG. 2 is a structural schematic view of the connector of FIG. 1 after the first connection end and the second connection end are connected.
Figure 3:
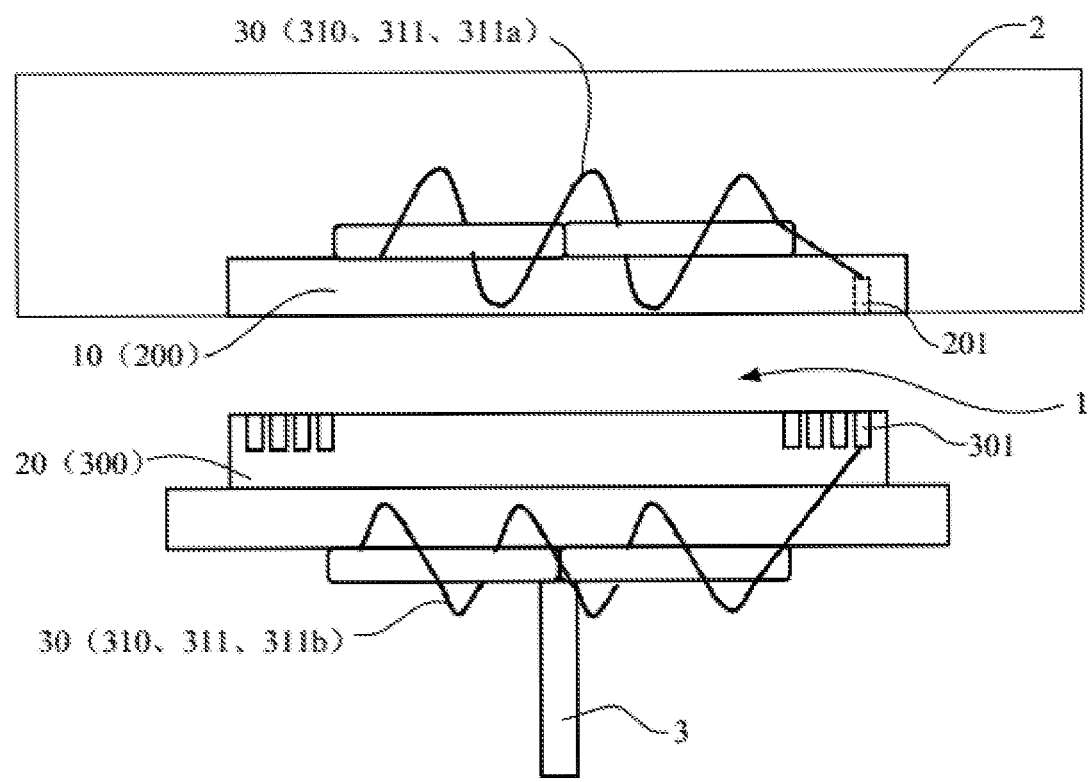
FIG. 3 is a structural schematic view of a connector of another embodiment of the present application when the first connection end and the second connection end are not connected.
Figure 4:
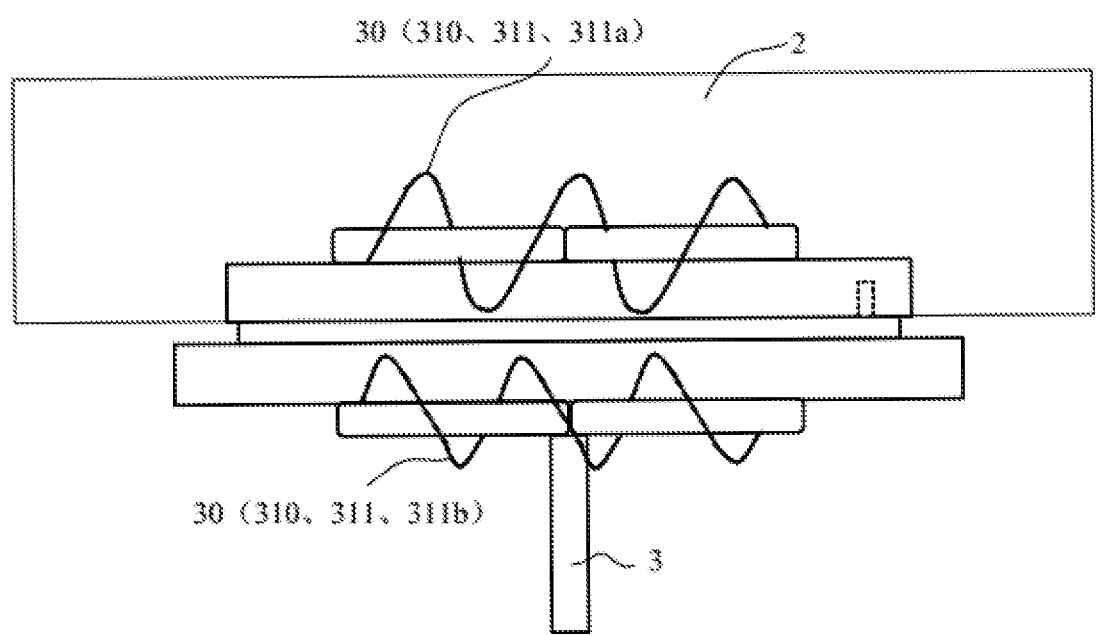
FIG. 4 is a structural schematic view of the connector of FIG. 3 after the first connection end and the second connection end are connected.

In an embodiment of the present application, referring to FIG. 1 to FIG. 2, and in conjunction with FIG. 3 and FIG. 4, the connector 1 includes:

a first connection end 10;

a second connection end 20 detachably connected to the first connection end 10; and an anti-off part 30 configured to restrict the first connection end 10 and the second connection end 20 from being separated from each other and disconnected when the first connection end 10 and the second connection end 20 are energized and conductive.

Specifically, the above connector 1 can be used for signal transmission and/or power connection, and the first connection end 10 and the second connection end 20 of the connector 1 are detachably connected together, for example, the first connection end 10 and the second connection end 20 are detachably connected by means of plug fit (swap fit), threaded connection or snap fit. It can be understood that, in an alternative implementation, after the first connection end 10 and the second connection end 20 of the connector 1 are connected to each other by the plug method, conducting of the first connection end 10 and the second connection end 20 can be realized when the power is on.

In order to prevent the occurrence of the "hot plug" phenomenon of the first connection end 10 and the second connection end 20 due to the misoperation in the energized and conductive state, the connector 1 is further provided with an anti-off part 30 for preventing the first connection end 10 and the second connection end 20 from being disconnected from each other to prevent the occurrence of "hot plug" phenomenon when the connector 1 is in the energized and conductive state, to protect the safety of the electronics connected to the connector 1.

It can be understood that in the electronic device, the first connection end 10 and/or the second end of the connector 1 are usually connected with various electrical components, so when the "hot plug" phenomenon of the first connection end 10 and the second connection end 20 occurs and the connection between the first connection end 10 and the second connection end 20 is broken, the instantaneous high voltage or high current is easily generated in the junction at this time, causing damage to other electrical components, thereby causing the performance of the entire electronic device to degrade or the service life to reduce. The first connection end 10 and the second connection end 20 can be prevented from being separated from each other in the energized and conductive state by providing the anti-off part 30 in the connector 1, thereby avoiding the disconnection of the connector 1 when energized and conductive. Therefore, damages to the electrical components caused by the instantaneous high voltage or high current generated by the disconnection are prevented, ensuring the operational reliability and the service life of the electronic device.

During the use of the connector 1, the first connection end 10 and the second connection end 20 are repeatedly connected and disconnected, in order to facilitate the separation of the first connector 1 and the second connector 1 in the case of power failure. The above-mentioned anti-off part 30 has different states, that is, an adsorption state and a failure state, wherein:

When the first connection end 10 and the second connection end 20 are energized and conductive, the anti-off part 30 is in an adsorption state, and the anti-off part 30 generates an adsorption force for the first connecting end 10 and the second connecting end 20 to approach each other;

when the first connection end 10 and the second connection end 20 are deenergized, the anti-off part 30 is in an failure state, and the adsorption force of the anti-off part 30 disappears.

It should be noted that the above-mentioned anti-off part 30 selects to switch between the adsorption state and the failure state according to the energization condition of the connector 1, that is, when the connector 1 is energized, the anti-off part 30 is in an adsorption state, thereby preventing the first connection end 10 and the second connection end 20 from being separated from each other; when the connector 1 is deenergized, the anti-off part 30 is in a failure state, and the force of the anti-off part 30 on the first connection end 10 and the second connection end 20 disappears, thereby facilitating the easy separation of the first connection end 10 and the second connection end 20.

The above-mentioned anti-off part 30 can be implemented in various manners. Some specific implementations of the anti-off part 30 are specifically described below:

In an embodiment, referring to FIGS. 1 and 2, the anti-off part 30 includes a magnetic portion 310 and a magnetic conductive portion 320 that are mutually adsorbable, and one of the magnetic portion 310 and the magnetic conductive portion 320 is disposed on the first connection end 10, and the other is disposed on the second connection end 20. The magnetic portion 310 may generate a magnetic force to attract the magnetic conductive portion 320 towards the magnetic portion 310 within a certain magnetic field range. The above-mentioned magnetic conductive portion 320 may be made of a magnetic conductive material such as iron or stainless steel. In addition, it should be additionally noted that the magnetic portion 310 is not a permanent magnet, and the magnetic field thereof can be changed, that is, the magnetic portion 310 can generate a magnetic field and has magnetic properties when the connector 1 is energized, and no magnetic field is generated and there is no magnetic property when the magnetic portion 310 is deenergized.

It can be understood that the magnetic portion 310 can be realized by the form of the electromagnetic coil 311, that is, the magnetic portion 310 can be formed by the electromagnet structure. When the electromagnet is energized, a magnetic field can be generated to generate magnetic adsorption force to the magnetic conductive portion 320; when the electromagnet is deenergized, the magnetic field disappears and the magnetic adsorption force to the magnetic conductive portion 320 also disappears.

For the magnetic portion 310, there are various energization modes. For example, in an implementation, the magnetic portion 310 is connected to an external power source. When the connector 1 is energized, the external power source supplies power to the electromagnetic coil 311. When the connector is deenergized, the external power supply also stops supplying power to the electromagnetic coil 311; in another implementation, one end of the electromagnetic coil 311 is connected to the conductivity electrode of the first connection end 10, and the other end of the electromagnetic coil 311 is grounded. At this time, a current loop is formed, and when the first connection end 10 is energized, so is the electromagnetic coil 311, and when the first connection end 10 is deenergized, so is the electromagnetic coil 311; similarly, one end of the electromagnetic coil 311 is also connected to the conductivity electrode of the second connection end 20, and the other end of the electromagnetic coil 311 is grounded, and details are not described herein again.

In an embodiment, referring to FIGS. 3 and 4, the anti-off part 30 includes two magnetic portions 310 that are mutually adsorbable, and one of the two magnetic portions 310 is disposed on the first connection end 10, and the other is disposed on the second connection end 20. It should be additionally noted that the magnetic portion 310 is not a permanent magnet, and the magnetic field thereof can be changed, that is, the magnetic portion 310 can generate a magnetic field and has magnetic properties when the connector 1 is energized, and no magnetic field is generated and there is no magnetic property when the magnetic portion 310 is deenergized.

It can be understood that the magnetic portion 310 can be realized by the form of the electromagnetic coil 311, that is, the magnetic portion 310 can be formed by the electromagnet structure. When the electromagnet is energized, a magnetic field can be generated to generate magnetic adsorption force; when the electromagnet is deenergized, the magnetic field disappears and the magnetic adsorption force also disappears.

For the magnetic portion 310, there are various energization modes. For example, in an implementation, the magnetic portion 310 is connected to an external power source. When the connector 1 is energized, the external power source supplies power to the electromagnetic coil 311. When the connector is deenergized, the external power supply also stops supplying power to the electromagnetic coil 311; in another implementation, the electromagnetic coil 311 located on the first connection end 10 is powered by the first connection end 10, and the electromagnetic coil 311 located on the second connection end 20 is powered by the second connection end 20, and when the first connection end 10 and the second connection end 20 is energized, both of the electromagnetic coils 311 are energized, thereby generating magnetic absorption forces that are mutually adsorbed.

It should be noted that one end of the electromagnetic coil 311 located on the first connection end 10 is connected to the conductivity electrode of the first connection end 10, and the other end of the electromagnetic coil 311 is grounded. At this time, a first current loop is formed, and when the first connection end 10 is energized, so is the electromagnetic coil 311, and when the first connection end 10 is deenergized, so is the electromagnetic coil 311; similarly, one end of the electromagnetic coil 311 located on the second connection end 20 is also connected to the conductivity electrode of the second connection end 20, and the other end of the electromagnetic coil 311 is grounded, and a second current loop is formed at this time. In order to ensure that the two electromagnetic coils 311 can generate magnetic absorption forces that attract each other, the current directions of the two electromagnetic coils 311 need to be opposite according to the right-handed screw rule, so that the generated magnetic field can attract the opposite, that is, the current directions of the first current loop and the second current loop are opposite.

In order to ensure that the magnetic portion 310 can generate an adsorption force of sufficient strength, the power supply voltage of the two ends of the electromagnetic coil 311 cannot be too small, and at the same time, in order to ensure the electricity safety and prevent the potential safety hazard of electricity, the power supply voltage of the electromagnetic coil 311 also can't be too high. The safety voltage value of the human body is 36V. In the present embodiment, the power supply voltage value of the electromagnetic coil 311 can be selected from 9V to 36V in order to balance the electricity safety and the anti-off reliability of the anti-off part 30.

In order to understand the inventive concept of the present application more clearly, the specific application mode of the connector 1 is specifically described below by taking a display screen as an example:

Continuing to refer to FIGS. 3 and 4, the display screen is a common display device. The display screen usually includes a LCD module and a circuit board 2 and a connecting line 3. The circuit board 2 has a driving circuit running with the LCD module, and various types of interface. The connecting line 3 is used to connect the LCD module with interfaces on the circuit board 2 and/or to connect other devices with interfaces on the circuit board 2. The connecting line 3 can be used for signal transmission and/or power transmission. In order to facilitate the connection of the connecting line 3 with the interface on the circuit board 2, a connector 1 is usually provided in the display screen, and the first connection end 10 of the connector 1 is provided on the interface of the circuit board 2, and the second connection end 20 of the connector 1 is provided at one end of the connecting line 3; alternatively, the second connection end 20 of the connector 1 is provided on the interface of the circuit board 2, and the first connection end 10 of the connector 1 is provided at one end of the connecting line 3. In this way, the connector 1 ensures that the interface between the connecting line 3 and the circuit board 2 does not generate a "hot plug" phenomenon when connected and energized, avoiding instantaneous high voltage or high current inside the display screen, thereby protecting electrical component such as the LCD module and a driving circuit.

For example, referring to FIG. 2, when the connecting line 3 is used to connect the circuit board 2 and the LCD module, the circuit board 2 is provided with a first interface 200, and one end of the connecting line 3 is provided with a second interface 300 that can plug fit with the first interface 200 while the other end of the connecting line 3 is connected to the LCD module. The first interface 200 has a first pin 201 (which may also be a pin structure, etc.), the second interface 300 has a second pin 301 (which may also be a pin structure, etc.). The first pin 201 is the powersupply pin of the first interface 200, and the second pin 301 is the powersupply pin of the second interface 300. When the first interface 200 and the second interface 300 fit, the first pin 201 and the second pin 301 are connected and conductive mutually. The first connection end 10 of the connector 1 includes a first interface 200 and a first electromagnetic coil 311a disposed on the first interface 200. One end of the first electromagnetic coil 311a is electrically connected to the first pin 201, and the other end is grounded; the second connection end 20 of the connector 1 includes a second interface 300 and a second electromagnetic coil 311b disposed on the second interface 300. One end of the second electromagnetic coil 311b is electrically connected to the second pin 301, and the other end is grounded. In this way, after the connecting line 3 and the circuit board 2 are connected, energized and conductive, the first electromagnetic coil 311a is power-on, so is the second electromagnetic coil 311b. The first electromagnetic coil 311a and the second electromagnetic coil 311b generate a magnetic absorption force that attracts each other, so that the first interface 200 and the second interface 300 can be restricted from being separated from each other in an energized state, achieving an "anti-off" effect.

It should be noted that in order to ensure that the first electromagnetic coil 311a and the second electromagnetic coil 311b can generate magnetic absorption forces that attract each other, the current directions of the first electromagnetic coil 311a and the second electromagnetic coil 311b need to be opposite according to the right-handed screw rule, so that the generated magnetic field can achieve the effect of opposites attract.

In order to ensure that the first electromagnetic coil 311a and the second electromagnetic coil 311b can generate an adsorption force of sufficient strength, the power supply voltage of the two ends of the above-mentioned electromagnetic coil 311 cannot be too small, and at the same time, in order to ensure the electricity safety and prevent the potential safety hazard of electricity, the power supply voltage of the first electromagnetic coil 311a and the second electromagnetic coil 311b also can't be too high. The safety voltage value of the human body is 36V, and the power supply voltage values of the first electromagnetic coil 311a and the second electromagnetic coil 311b can be selected from 9V to 36V respectively, in order to balance the electrical safety and the anti-off reliability of the anti-off part 30.

The above-mentioned first electromagnetic coil 311a and the second electromagnetic coil 311b are connected to an external power source. When the connector 1 is energized, the external power source supplies power to the first electromagnetic coil 311a and the second electromagnetic coil 311b. When the connector 1 is deenergized, the external power source also stops supplying power to the first electromagnetic coil 311a and the second electromagnetic coil 311b.

In addition, in some other modified implementations, referring to FIGS. 1 and 2, for the connector 1 described above, the first connection end 10 thereof may also include a first interface 200 and a magnetic conductive portion 320 located on the second interface 300. The second connection end 20 may also include a second interface 300 and an electromagnetic coil 311 located on the second interface 300. The first interface 200 has a first pin 201 (which may also be a pin structure, etc.), the second interface 300 has a second pin 301 (which may also be a pin structure, etc.). The first pin 201 is the powersupply pin of the first interface 200, and the second pin 301 is the powersupply pin of the second interface 300. When the first interface 200 and the second interface 300 fit, the first pin 201 and the second pin 301 are connected and conductive mutually. One end of the electromagnetic coil 311 located on the second interface 300 is electrically connected to the second pin 301, and the other end is grounded. In this way, after the connecting line 3 and the circuit board 2 are connected, energized and conductive, the electromagnetic coil 311 located on the second interface 300 is also power-on. The second electromagnetic coil 311b generates a magnetic absorption force, thereby attracting the magnetic conductive portion 320 on the first interface 200, that is, the first interface 200 and the second interface 300 can be restricted from being separated from each other in an energized state, achieving an "anti-off" effect.

The above-mentioned magnetic conductive portion 320 may be made of a magnetic conductive material such as iron or stainless steel.

Referring to FIGS. 1 to 4, the present application further proposes a display screen, including a LCD module, a circuit board 2, a connecting line 3, and a connector 1. The circuit board 2 is electrically connected to the LCD module. One of the first connection end 10 and the second connection end 20 of the connector 1 is disposed on the circuit board 2, and the other is disposed at one end of the connecting line 3. The specific structure of the connector 1 is with reference to the above embodiments. Since the display screen adopts all the technical schemes of all the above embodiments, it has at least all the beneficial effects brought about by the technical schemes of the above embodiments, and details are not described herein again.

The present application also proposes an electronic device including a connector. The specific structure of the connector is with reference to the above embodiments. Since the electronic device adopts all the technical schemes of all the above embodiments, it has at least all the beneficial effects brought about by the technical schemes of the above embodiments, and details are not described herein again.

The embodiments above are merely some embodiments of the present disclosure but are not to be construed as limiting the scope of the present disclosure, and any equivalent structural conversion devised based on the inventive concept of the present disclosure or using the drawing of the present disclosure, or a direct or indirect application of the present disclosure to another related technical field shall fall into the scope of protection of the present disclosure.

What is claimed is:

1. A connector, comprising:
   a first connection end;
   a second connection end detachably connected to the first connection end; and
   an anti-off part configured to restrict the first connection end and the second connection end from being separated from each other and disconnected when the first connection end and the second connection end are energized and conductive;
   wherein the anti-off part has an adsorption state and a failure status,
   the anti-off part is in an adsorption state, and the anti-off part generates an adsorption force for the first connection end and the second connection end to approach each other when the first connection end and the second connection end are powered on;
   the anti-off part is in a failure state, and the adsorption force of the anti-off part disappears when the first connection end and the second connection end are deenergized;
   the anti-off part comprises two magnetic portions that are mutually adsorbable, and one of the two magnetic portions is disposed on a back of the first connection end not attaching with the second connection end, and the other is disposed on a back of the second connection end not attaching with the first connection end;
   each magnetic portion comprises an electromagnetic coil, and the electromagnetic coil located on the first connection end is powered by the first connection end, and the electromagnetic coil located on the second connection end is powered by the second connection end.

2. The connector according to claim 1, wherein:
   one end of the electromagnetic coil located on the first connection end is connected to the conductivity electrode of the first connection end, and the other end is grounded to form a first current loop;
   one end of the electromagnetic coil located on the second connection end is connected to the conductivity electrode of the second connection end, and the other end is grounded to form a second current loop whose current direction is opposite to that of the first current loop.

3. A display screen, comprising:
   a LCD module;
   a circuit board electrically connected to the LCD module;
   a connecting line; and
   a connector according to claim 1.

4. The display screen according to claim 3, wherein, when the connecting line is used to connect the circuit board and the LCD module, the circuit board is provided with a first interface, one end of the connecting line is provided with a second interface configured to plug fit with the first interface and the other end of the connecting line is connected to the LCD module.

5. The display screen according to claim 4, wherein, the first interface has a first pin and the first pin is a power supply pin of the first interface; and
   the second interface has a second pin and the second pin is a power supply pin of the second interface,
   when the first interface and the second interface fit, the first pin and the second pin are connected and conductive mutually.

6. The display screen according to claim 5, wherein, one end of the first electromagnetic coil located on the first connection end is electrically connected to the first pin, and the other end is grounded;
   one end of the second electromagnetic coil located on the second connection end is electrically connected to the second pin, and the other end is grounded; and
   after the connecting line and the circuit board are connected, energized and conductive, the first electromagnetic coil is powered on, and the second electromagnetic coil is powered on, the first electromagnetic coil and the second electromagnetic coil attract each other, to restrict the first interface and the second interface from being separated from each other.

7. An electronic device comprising a connector according to claim 1.

* * * * *